US011200746B2

(12) United States Patent
Lee et al.

(10) Patent No.: US 11,200,746 B2
(45) Date of Patent: Dec. 14, 2021

(54) DEVICE AND METHOD TO DISPLAY OBJECT WITH VISUAL EFFECT

(71) Applicant: Samsung Electronics Co., Ltd., Suwon-si (KR)

(72) Inventors: KeeChang Lee, Seongnam-si (KR); Minsu Ahn, Seoul (KR); Inwoo Ha, Yongin-si (KR); Seungin Park, Hwaseong-si (KR); Hyong Euk Lee, Suwon-si (KR); Heesae Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/782,518

(22) Filed: Feb. 5, 2020

(65) Prior Publication Data

US 2020/0175771 A1    Jun. 4, 2020

Related U.S. Application Data

(63) Continuation of application No. 14/636,969, filed on Mar. 3, 2015, now Pat. No. 10,593,113.

(30) Foreign Application Priority Data

Jul. 8, 2014   (KR) .................. 10-2014-0085024
Jul. 30, 2014  (KR) .................. 10-2014-0097313

(51) Int. Cl.
*G06T 19/00*    (2011.01)
*G06T 15/50*    (2011.01)
*G06F 3/0481*   (2013.01)
*G06T 19/20*    (2011.01)

(52) U.S. Cl.
CPC ........ *G06T 19/006* (2013.01); *G06F 3/04815* (2013.01); *G06T 15/506* (2013.01); *G06T 19/20* (2013.01); *G06T 2219/2012* (2013.01)

(58) Field of Classification Search
None
See application file for complete search history.

(56) References Cited

U.S. PATENT DOCUMENTS

| 6,639,595 | B1 | 10/2003 | Drebin et al. |
| 7,259,747 | B2 | 8/2007 | Bell |
| 8,451,270 | B2 | 5/2013 | Boulton |
| 2002/0022515 | A1 | 2/2002 | Boku et al. |
| 2007/0038944 | A1 | 2/2007 | Carignano et al. |
| 2008/0204663 | A1 | 8/2008 | Balogh |

(Continued)

FOREIGN PATENT DOCUMENTS

| CN | 1989773 A | 6/2007 |
| CN | 102769822 A | 11/2012 |

(Continued)

OTHER PUBLICATIONS

Keller, A., "Instant Radiosity," Association for Computer Machinery, Aug. 3, 1997 (8 pages).

(Continued)

*Primary Examiner* — Matthew Salvucci
(74) *Attorney, Agent, or Firm* — NSIP Law

(57) ABSTRACT

A display method includes displaying, in a virtual environment, an object to which a light source is set. The method further includes illuminating an area around the object based on the light source.

25 Claims, 11 Drawing Sheets

(56) References Cited

U.S. PATENT DOCUMENTS

| | | | |
|---|---|---|---|
| 2009/0201309 A1* | 8/2009 | Demos | G01J 3/50 345/589 |
| 2011/0012901 A1 | 1/2011 | Kaplanyan | |
| 2011/0083108 A1 | 4/2011 | Klein et al. | |
| 2012/0075484 A1 | 3/2012 | Kawamoto et al. | |
| 2014/0043321 A1 | 2/2014 | Matjasko | |

FOREIGN PATENT DOCUMENTS

| | | | |
|---|---|---|---|
| CN | 103391400 A | 11/2013 | |
| CN | 103606182 A | 2/2014 | |
| EP | 2 434 458 A2 | 3/2012 | |
| JP | H07-281652 A | 10/1995 | |
| JP | H10-222701 A | 8/1998 | |
| JP | 2003-109034 A | 4/2003 | |
| JP | 2005-072964 A | 3/2005 | |
| JP | 2010-128986 A | 6/2010 | |
| JP | 2011-188024 A | 9/2011 | |
| JP | 2012-069074 A | 4/2012 | |
| JP | 2014-089697 A | 5/2014 | |
| KR | 10-2011-0032366 A | 3/2011 | |
| KR | 10-2011-0107545 A | 10/2011 | |
| KR | 10-2012-0004227 A | 1/2012 | |
| KR | 10-1266360 B1 | 5/2013 | |

OTHER PUBLICATIONS

Saito et al., "POV-Ray Introduction to Be the first to start a 3DCG," 2009, pp. 62-65.

Rivera, Mark, "Lighting and Texturing in Maya: 3D Computer Monitor Part 2," DevWebPro-Web Developer Tutorials & News, Jun. 23, 2010 (9 pages in English).

Ablan, D., "Inside Lightwave 3D v10: Lighting," Pearson Education, Jun. 1, 2011 (2 pages).

Anonymous, "Global illumination," Wikipedia, Feb. 8, 2014 (4 pages).

Anonymous, "Shading," Wikipedia, Jun. 1, 2014 (6 pages).

Partial European Search Report issued in counterpart European Application No. 15172704.7 dated Jan. 14, 2016 (6 pages).

Extended European Search Report dated Jun. 8, 2016 in counterpart European Application No. 15172704.7 (17 pages).

Oral Proceedings issued by European Patent Office on Jun. 7, 2017 in corresponding EP Patent Application No. 15172704.7 (14 pages in English).

Chinese Office Action dated Nov. 19, 2018 in Chinese Patent Application No. 201510334943.2 (23 pages in English, 17 pages in Chinese).

Japanese Office Action dated Jul. 2, 2019 in corresponding Japanese Patent Application No. 2015-125252 (6 pages in Japanese).

Chinese Office Action dated Jul. 30, 2019 in corresponding Chinese Patent Application No. 201510334943.2 (24 pages in English, 17 pages in Chinese).

Korean Office Action dated Sep. 24, 2020 for the corresponding Korean Patent Application No. 10-2014-0097313. (3 pages in English)(7 pages in Korean).

Chinese Office Action dated Oct. 20, 2021 in counterpart Chinese Patent Application No. 201510334943.2 (22 pages in English, 16 pages in Chinese).

\* cited by examiner

DEVICE AND METHOD TO DISPLAY OBJECT WITH VISUAL EFFECT

CROSS-REFERENCE TO RELATED APPLICATIONS

This application is a continuation of U.S. patent application Ser. No. 14/636,969 filed on Mar. 3, 2015, which claims the benefit under 35 U.S.C. § 119(a) of Korean Patent Application No. 10-2014-0085024 filed on Jul. 8, 2014, and Korean Patent Application No. 10-2014-0097313 filed on Jul. 30, 2014, in the Korean Intellectual Property Office, the entire disclosures of which are incorporated herein by reference for all purposes.

BACKGROUND

1. Field

The following description relates to a device and a method to display an object with a visual effect.

2. Description of Related Art

With the development in mobile graphic processing unit (GPU) technology, content providers may provide virtual environment contents by applying three-dimensional (3D) graphics technology to mobile devices. Mobile devices having appeared ahead of smartphones have simply provided planar two-dimensional (2D) contents using 2D graphics technology. However, current mobile devices such as smartphones support a high performance central processing unit (CPU) and a GPU. As noted above, current mobile devices support a hardware environment capable of supporting 3D graphics and a software standard associated with the hardware environment. The software standard is an industrial standard, for example, open graphics library for embedded systems (OpenGL ES). In addition, 3D graphics technology of a mobile device provides a base in which it is possible to create a realistic virtual object for maximizing the sense of immersion in augmented reality (AR) and virtual reality (VR), and to provide the created virtual object to a user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a display method including displaying, in a virtual environment, an object to which a light source is set, and illuminating an area around the object based on the light source.

The method may further include setting the light source to the object.

The setting may include setting positions of light sources in a grid form on an object area of the object.

The method may further include setting an illuminating orientation and a position of the light source, and setting a cut-off angle and an intensity attenuation of the light source, based on the illuminating orientation.

The illuminating may include calculating the area based on the illuminating orientation and the cut-off angle.

The method may further include extracting, from the object, a color of a position of the light source. The illuminating may include applying the color to the light source.

The extracting may include extracting, from the object as a value of the color, one of an average value, a weighted average value, and a median value of color values around the position of the light source.

The illuminating may include controlling either one or both of a level of the illumination of the area, and a size of the illuminated area, in response to a control signal.

The object may include either one or both of a still image object and a video object.

The method may further include excluding a visual effect of the light source on an inside of the object.

In another general aspect, there is provided a display device including a display, and a processor configured to display, on the display in a virtual environment, an object to which a light source is set, and illuminate, on the display, an area around the object based on the light source.

The processor may be further configured to set any one or any combination of an illuminating orientation, a position, a cut-off angle, and an intensity attenuation of the light source.

The processor may be configured to calculate the area based on any one or any combination of the illuminating orientation, the position, the cut-off angle, and the intensity attenuation.

The processor may be configured to extract, from the object, a color of a position of the light source, and apply the color to the light source.

The processor may be configured to extract, from the object as a value of the color, one of an average value, a weighted average value, and a median value of color values around the position of the light source.

The processor may be further configured to control a level of the illumination of the area in response to a control signal.

The object may include a video object, the virtual environment may include a virtual space in which the video object is provided, and the processor may be configured to apply, to the light source, a color of a position of the light source in a frame per frame of the video object.

The object may include a photo object, the virtual environment may include a virtual space in which the photo object is provided based on a predetermined arrangement, and the processor may be configured to illuminate, on the display, the virtual space based on the light source.

The processor may be further configured to set a brightness of the light source set to the object of objects in the virtual environment to be brighter than a brightness of another light source set to another object of the objects.

The display may include any one or any combination of a head mounted display, a stereoscopic display, and a touch screen.

In still another general aspect, there is provided a display device including a display configured to display an image including an object, an interface configured to receive an input, and a processor configured to maintain a visual effect on the object, and change a visual effect on surroundings of the object, in response to the input.

The processor may be configured to calculate the visual effect on the surroundings of the object based on the object.

The processor may be configured to change a level of an illumination effect on the surroundings of the object by a light source set to the object, in response to the input.

The processor may be configured to turn on and off the visual effect on the surroundings of the object, in response to the input.

The processor may be configured to extract a color from a portion of the object, and apply the color to the visual effect on the surroundings of the object.

In yet another general aspect, there is provided a display device including a display configured to display an image including a video object, and a processor configured to change a visual effect on surroundings of the video object per frame of the video object, during playing the video object.

The processor may be configured to create the visual effect based on a light source set to the video object.

The processor may be configured to apply, to a light source set to the video object, a color of a position of the light source in a frame per frame of the video object, during playing the video object.

In still another general aspect, there is provided a display device including a processor configured to set, to an object in a virtual environment, a type and a position of a light source, and illuminate an area around the object with the light source.

The processor may be further configured to set a direction, a cut-off angle, and an intensity attenuation of the light source in response to the light source being a spot light.

The processor may be configured to extract, from the object, a color of the position of the light source, and apply the color to the light source.

Other features and aspects will be apparent from the following detailed description, the drawings, and the claims.

Figure 1:
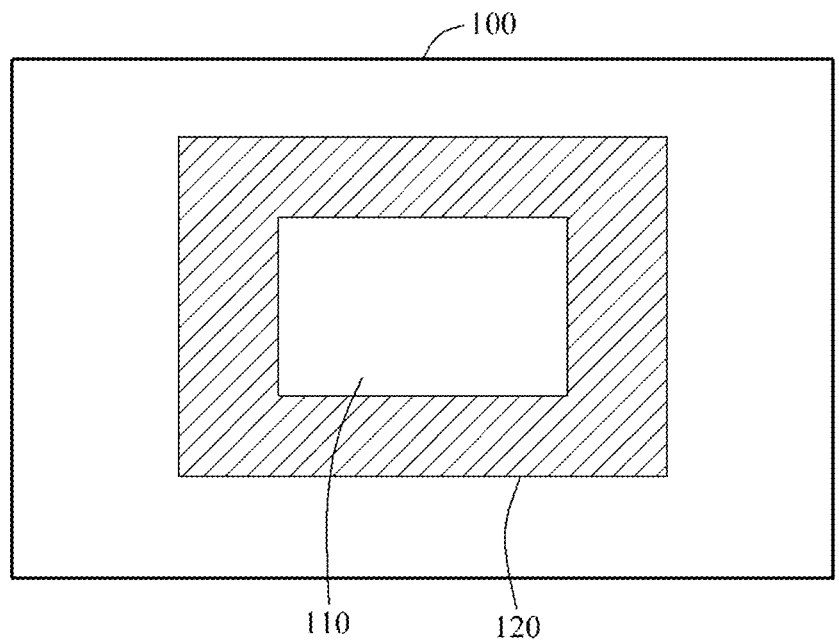
FIG. 1 is a diagram illustrating an example of displaying an object and a visual effect.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

An application associated with augmented reality (AR) and virtual reality (VR) may be used in an immersive device such as a glass-type display and a head mounted display (HMD), for example. The application associated with the AR and the VR may need three-dimensional (3D) graphics technology that is realistic and maximizes the sense of immersion.

For example, many mobile devices and general personal computers (PCs) may provide a software standard, for example, DirectX, open graphics library (OpenGL), or OpenGL for embedded systems (OpenGL ES), which is capable of representing 3D graphics, together with hardware including a graphic processing unit (GPU). A simple light effect representation may be configured with the software standard alone. It may be difficult to achieve a complex light effect, or a calculation using a relatively high complexity may be required.

For example, a mobile device to which the software standard is provided may not readily represent a visual change influencing surroundings due to an object having a bright characteristic in a virtual environment. When using only the software standard, a complex physical operation may be required. Thus, it may be difficult to represent a visual effect by an enlightening object in real time in a mobile environment and a general PC environment.

Hereinafter, the term "visual effect" used herein may represent all visual changes displayed on a screen in association with an object. For example, the mobile device to which the software standard is provided may represent a direct optical effect, such as the sun and a bulb, for example, but may not readily represent an object having a visual effect on surroundings with a self-bright characteristic.

FIG. 1 is a diagram illustrating an example of displaying an object 110 and a visual effect 120. In this example, a method of representing the visual effect 120 by the object 110 having a bright characteristic in a virtual environment 100 may be provided without using a complex physical operation in a mobile device, such as a smartphone and a tablet PC, for example, by employing a light representation method provided from a software standard. The light representation method provided from the software standard will be described with reference to FIGS. 3 and 4.

The virtual environment 100 is a remaining virtual space to be displayed, aside from the object 110, on a screen of a display device. The virtual environment 100 includes the virtual space in which the object 110 is present. For example, the virtual environment 100 may include a VR cinema, a VR gallery, a VR museum, and/or a 3D space such as a virtual space rendered using, e.g., 3D graphics technology. In addition, the virtual environment 100 may include a two-dimensional (2D) space, such as a wallpaper in a visual operating system, for example. In this example, the virtual space rendered using the 3D graphics technology may be created by representing a predetermined environment in 3D graphics.

The object 110 is displayed on an object area of the screen of the display device. The object area refers to an area on which the object 110 is set to be displayed. For example, the object 110 is displayed to be located within the virtual environment 100. The object 110 may include a video object and/or a photo object, and has a bright characteristic.

The bright characteristic indicates a characteristic that the object 110 has the visual effect 120 on a virtual area around the object 110. For example, the object 110 to which a virtual light source is set is represented to have the bright characteristic. The visual effect 120 may include an illumination effect that a brightness and a color are represented on the virtual area displayed on the screen. For example, the illumination effect may be calculated by a processor of the display device based on the virtual light source, and may be represented on the virtual area.

The virtual light source refers to a light source set to the object 110 to illuminate the virtual area around the object 110. One or more virtual light sources may be set to the object 110. The virtual light source may be directly set to the object 110, and may be initially set to a display area and then set to the object 110. When the virtual light source is set to the display area, the display device may automatically set the virtual light source to the object 110. For example, in response to an input of a predetermined object, the processor may automatically set the virtual light source at a position of the object corresponding to a position of the virtual light source set to the display area.

Figure 2:
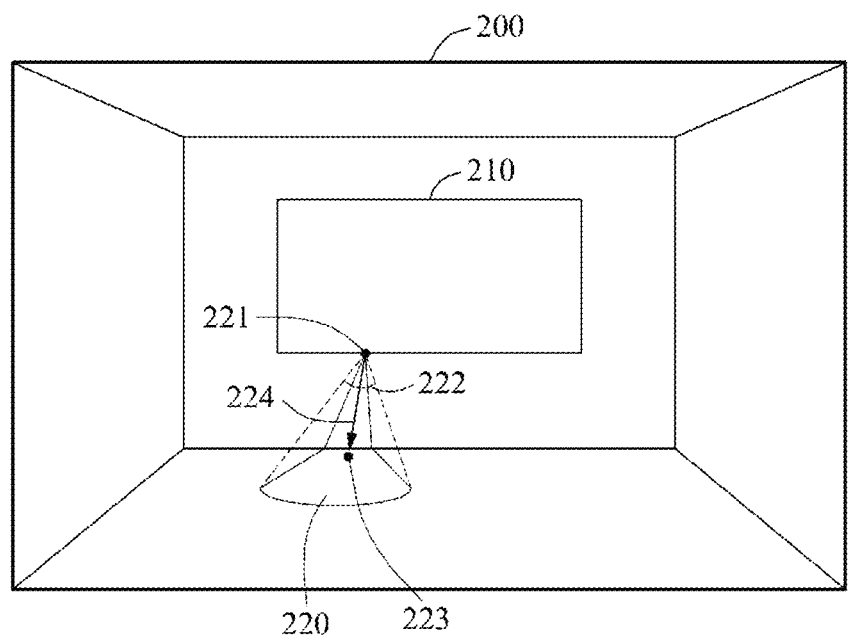
FIG. 2 is a diagram illustrating an example of a virtual environment in which a virtual light source is applied.

FIG. 2 is a diagram illustrating an example of a virtual environment 200 in which a virtual light source 221 is applied. Referring to FIG. 2, the virtual light source 221 is set to an object 210, and a virtual area 220 of the virtual environment 200 is illuminated. For example, the virtual environment 200 may be a 3D space in a rectangular shape of FIG. 2. The virtual light source 221 may be an example of a spot light type of FIG. 4.

The virtual area 220 may be calculated by a processor of a display device as an area toward which a light from the virtual light source 221 is projected. In this example, the virtual area 220 is an area within a cut-off angle 222 based on a center point 223 corresponding to an illuminating orientation 224 from the virtual light source 221.

Figure 3:
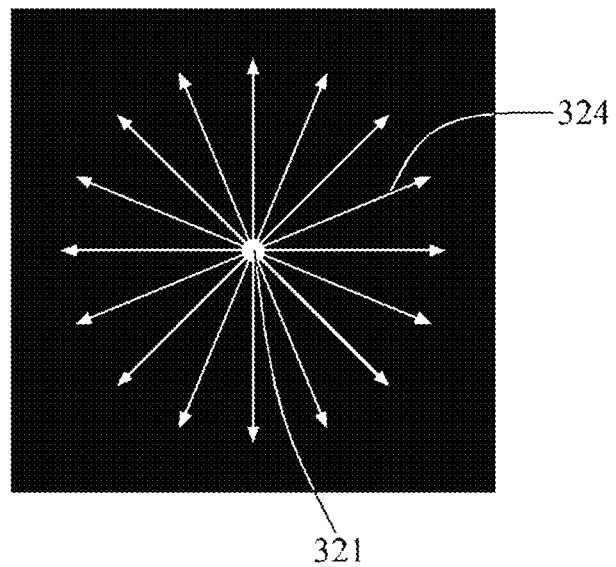
FIGS. 3 and 4 are diagrams illustrating examples of a type of a virtual light source.
Figure 4:
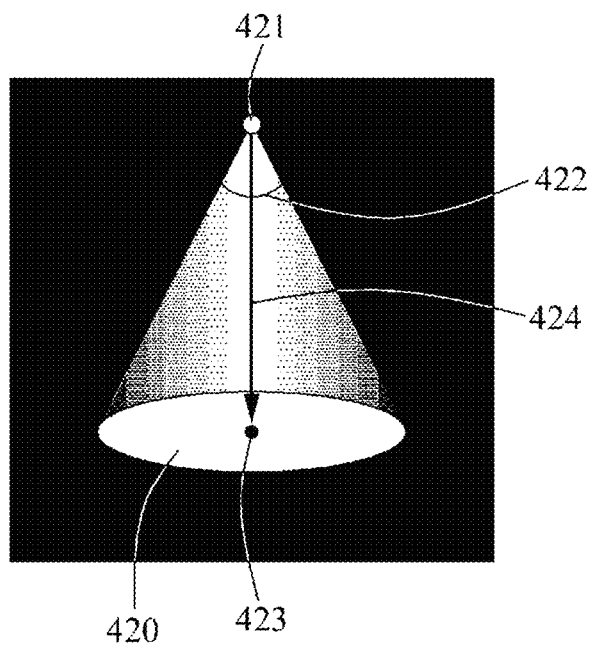

FIGS. 3 and 4 are diagrams illustrating examples of a type of a virtual light source.

FIG. 3 illustrates a virtual light source 321 of a point light type. The virtual light source 321 of the point light type refers to a light source that projects a light from a predetermined point toward an omni-direction 324. A virtual area projected by the virtual light source 321 of the point light type may be calculated with respect to the omni-direction 324 based on a position of the virtual light source 321. For example, the virtual area projected by the virtual light source 321 of the point light type may be an entire virtual environment.

FIG. 4 illustrates a virtual light source 421 of a spot light type. The virtual light source 421 of the spot light type refers to a light source that projects a light within a limited angle from a predetermined point, for example, within a cut-off angle 422. An illumination effect using the virtual light source 421 of the spot light type may be displayed based on an intensity attenuation within the cut-off angle 422.

The intensity attenuation may indicate a level of the illumination effect decreasing according to a decrease in a light amount as a distance becomes further away from a position of the virtual light source 421 within a virtual area 420. For example, the light amount decreases as the virtual area 420 becomes away from the virtual light source 421 of the spot light type, and the virtual light source 421 of the spot light type is represented to have the illumination effect within the cut-off angle 422 based on a center point 423 projected in an illuminating orientation 424 from the position of the virtual light source 421. The virtual light source 421 of the spot light type is represented to have no illumination effect in an area outside the cut-off angle 422.

The virtual light source 321 of the point light type of FIG. 3 and the virtual light source 421 of the spot light type of FIG. 4 may be configured based on, for example, a software standard. The software standard may also configure a virtual light source of a directional type having only a directivity.

Figure 5:
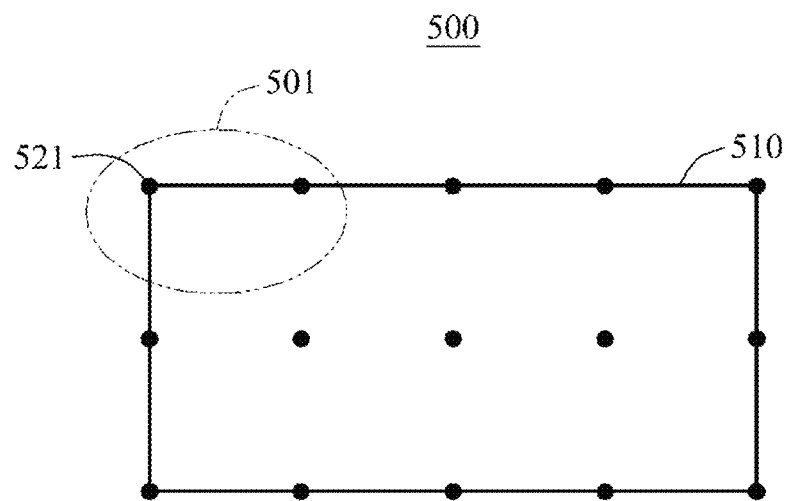
FIG. 5 is a diagram illustrating an example of an object to which a virtual light source is set.

FIG. 5 is a diagram illustrating an example of an object 510 to which a virtual light source 521 is set. Referring to FIG. 5, the virtual light source 521 is set to the object 510 present in a virtual environment 500. For example, a plurality of virtual light sources including the virtual light source 521 may be set to the object 510. The virtual light source 521 may be directly set to the object 510, or may be initially set to an object area of a display and then set to the object 510. For example, when the virtual light source 521 is set to the object area, a processor of a display device may automatically set the virtual light source 521 to the object 510 based on a position of the virtual light source 521 set to the object area. The object 510 or the object area to which the virtual light source 521 is to be set may be arbitrarily determined by a content provider or a user, and may be automatically determined by the processor. The content provider may refer to a person providing content of the object 510, and the user may refer to a user using the display device.

In FIG. 5, positions of the virtual light sources may be automatically set at predetermined intervals within the object 510 or the object area. For example, the virtual light sources may be set to be uniformly distributed in a grid form over the object 510 or the object area.

Figure 6:
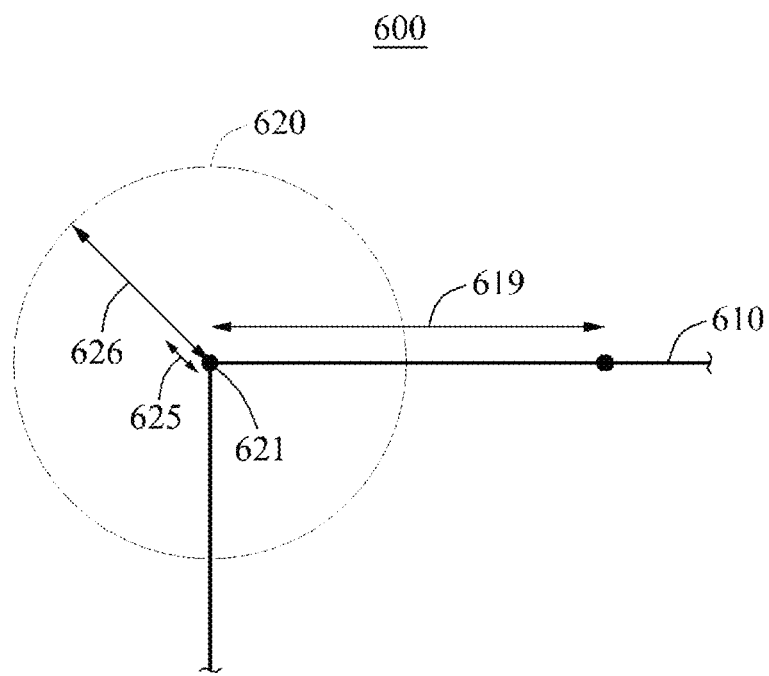
FIGS. 6 and 7 are diagrams illustrating examples of a virtual light source set to an object and a virtual area.
Figure 7:
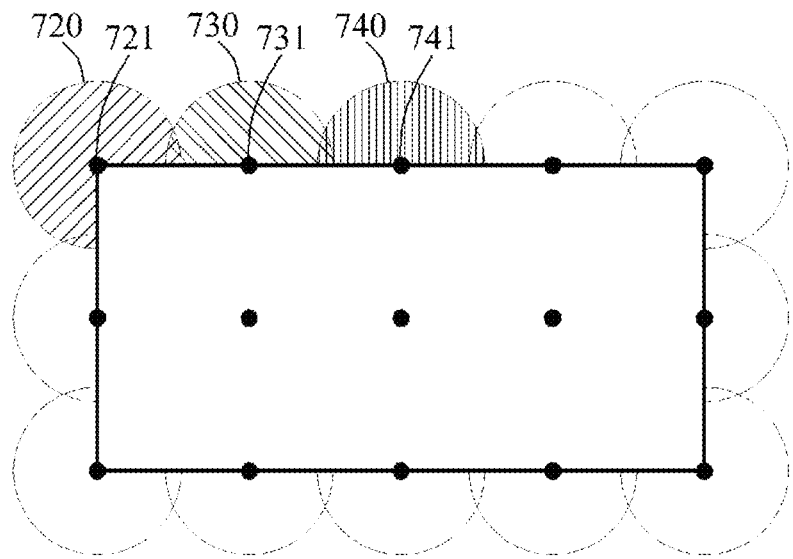

FIGS. 6 and 7 are diagrams illustrating examples of a virtual light source set to an object and a virtual area.

FIG. 6 illustrates an example in which a partial area 501 of the virtual environment 500 and the object 510 of FIG. 5 is enlarged. In this example, an object 610 is displayed in a rectangular shape.

All information of a virtual light source 621 may be automatically set, information of an intensity attenuation of the virtual light source 621 may be automatically set, and/or an interval 619 between each pair of virtual light sources including the virtual light source 621 may be automatically set. Also, all information of the virtual light source 621 may be set by a content provider and/or a user of a display device.

When all information of the virtual light source 621 is automatically set, a processor of the display device may automatically set the interval 619 between each pair of the virtual light sources including the virtual light source 621 based on, for example, a horizontal length of the object 610. In detail, positions of the virtual light sources may be set to be in a grid form having the predetermined interval 619 between each pair thereof. For example, the processor may perform calculations according to equations "interval=(horizontal length of object)/5", "(radius r with intensity attenuation of ¼)=interval/2", and "(cut-off radius of virtual area)=interval*2". In FIG. 6, with respect to the virtual light source 621, a cut-off radius 626 and a radius 625 with the intensity attenuation of ¼ may be calculated by the processor based on the interval 619 and the equations. A point corresponding to the radius 625 with the intensity attenuation of ¼ may indicate a point at which a light amount of the virtual light source 621 decreases to be ¼ and an illumination effect of a virtual area 620 decreases to be ¼.

The interval 619 between each pair of the virtual light sources including the virtual light source 621 may be arbitrarily set by the user and/or the content provider. For example, the interval 619 may be set to 10 by the user and/or the content provider. The interval 619 indicates a length in a coordinate system within a virtual environment 600, and may be a physical length or a nonphysical length. In this example, the interval 619 may be calculated by the processor according to the equations "(radius r with intensity attenuation of ¼)=interval/2" and/or "(cut-off radius of virtual area)=interval*2".

The radius 625 with the intensity attenuation of ¼ may be arbitrarily set by the user and/or the content provider. For example, the radius 625 with the intensity attenuation of ¼ may be set to 5 by the user and/or the content provider. The radius 625 with the intensity attenuation indicates a length in a coordinate system within the virtual environment 600, and may be a physical length or a nonphysical length. In this example, the cut-off radius 626 of the virtual area 620 and the interval 619 may be automatically set by the processor according to equations "cut-off radius=r*4" and "interval=r*2".

In the following examples, all information of the virtual light source 621 may be set by the content provider and/or the user. For example, the radius 625 with the intensity attenuation of ¼ and the cut-off radius 626 may be arbitrarily set by the content provider and/or the user, and may be used to calculate a level of the illumination effect, for example, a light amount within the virtual area 620. A light amount corresponding to a distance d from a position of the virtual light source 621 to a pixel on a screen may be calculated by the processor per frame when the display device operates in real time. For example, the light amount may be calculated according to an attenuation equation within the virtual area 620 when the distance d is less than the cut-off radius 626. For example, the attenuation equation may be expressed by "light amount=1/(1+2*(d/r)+(d/r)*(d/r))". The light amount may be calculated as 0 in an area aside from the virtual area 620 when the distance d is greater than or equal to the cut-off radius 626.

According to this example, the virtual area 620 may be referred to as an attenuation area, and represents an area influenced by the illumination effect by the virtual light source 621. A size of the virtual area 620 may be determined based on the cut-off radius 626. For example, when the virtual light source 621 is provided in a spot light type, the virtual area 620 may appear in a form in which a cone is projected on the virtual environment 600, and may be limited by a cut-off angle. In detail, the illumination effect may be absent in an area outside the cut-off angle.

The intensity attenuation may indicate the level of the illumination effect decreasing as a distance becomes further away in an illuminating orientation within the virtual area 620. When a value of the intensity attenuation is relatively large, the illumination effect may be concentrated and be applied on an area adjacent to the position of the virtual light source 621. When a value of the intensity attenuation is relatively small, the illumination effect may be overall uniformly applied within the virtual area 620.

When the virtual light source 621 is provided in a point light type, there is no need to set an illuminating orientation, a cut-off radius, and an intensity attenuation.

FIG. 7 is a diagram illustrating an example of a color applied to a virtual area by a virtual light source. A processor of a display device may extract, from an object, for example, an image object and/or a video object, a color value to be applied to a color of an illumination effect. For example, the processor may extract color values of pixels for portions of an object that correspond to positions of virtual light sources 721, 731, and 741, and may extract colors values by sampling color values from pixels of the object that are present around the positions of the virtual light sources 721, 731, and 741.

When the object, for example, an image object and/or a video object, to which the virtual light sources 721, 731, and 741 are set is complex, and has a great change over time, the processor may apply a color value extracted through sampling as a color of the illumination effect. For example, in the case of a video object, sampling may include calculating a statistical value of color values of pixels corresponding to the positions of the virtual light sources 721, 731, and 741 with respect to a predetermined number of frames, or calculating a statistical value of color values of pixels corresponding to an area around the positions of the virtual light sources 721, 731, and 741 with respect to the predetermined number of frames. The statistical value may be, for example, an average value, a weighted average value, or a median value. In this example, when the processor determines a color of the illumination effect through sampling of the video object, it is possible to prevent flickering from continuously occurring in response to a continuous transition between scenes.

Referring to FIG. 7, the processor may apply a visual effect, for example, an illumination effect, extracted as a first color value to a first virtual area 720 based on the virtual light source 721, may apply a visual effect extracted as a second color value to a second virtual area 730 based on the virtual light source 731, and may apply a visual effect extracted as a third color value to a third virtual area 740 based on the virtual light source 741. Although a color of a virtual area by a virtual light source is partially illustrated using deviant crease lines, it is only an example. The processor may apply each color from all virtual light sources to a corresponding virtual area.

A visual effect may be applied to an overlapping area among the first virtual area 720, the second virtual area 730, and the third virtual area 740, using a statistical value of color values of each virtual area. The statistical value may be, for example, an average value, a weighted average value, and a median value. The processor may calculate a level of the illumination effect, for example, a light amount to be applied to the overlapping area, to be a value acquired by adding up levels of illumination effects of the respective virtual areas that overlap.

Figure 8:
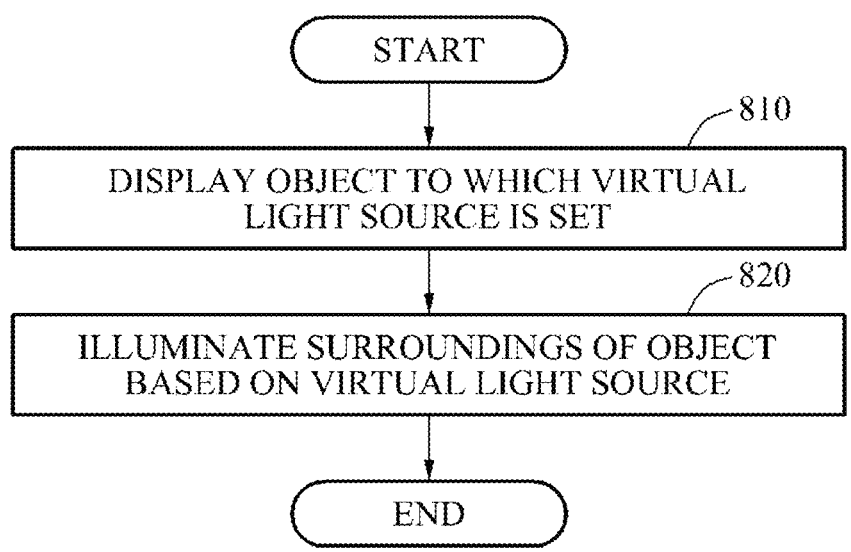
FIGS. 8 through 10 are flowcharts illustrating examples of a method of displaying an object to which a virtual light source is set.
Figure 9:
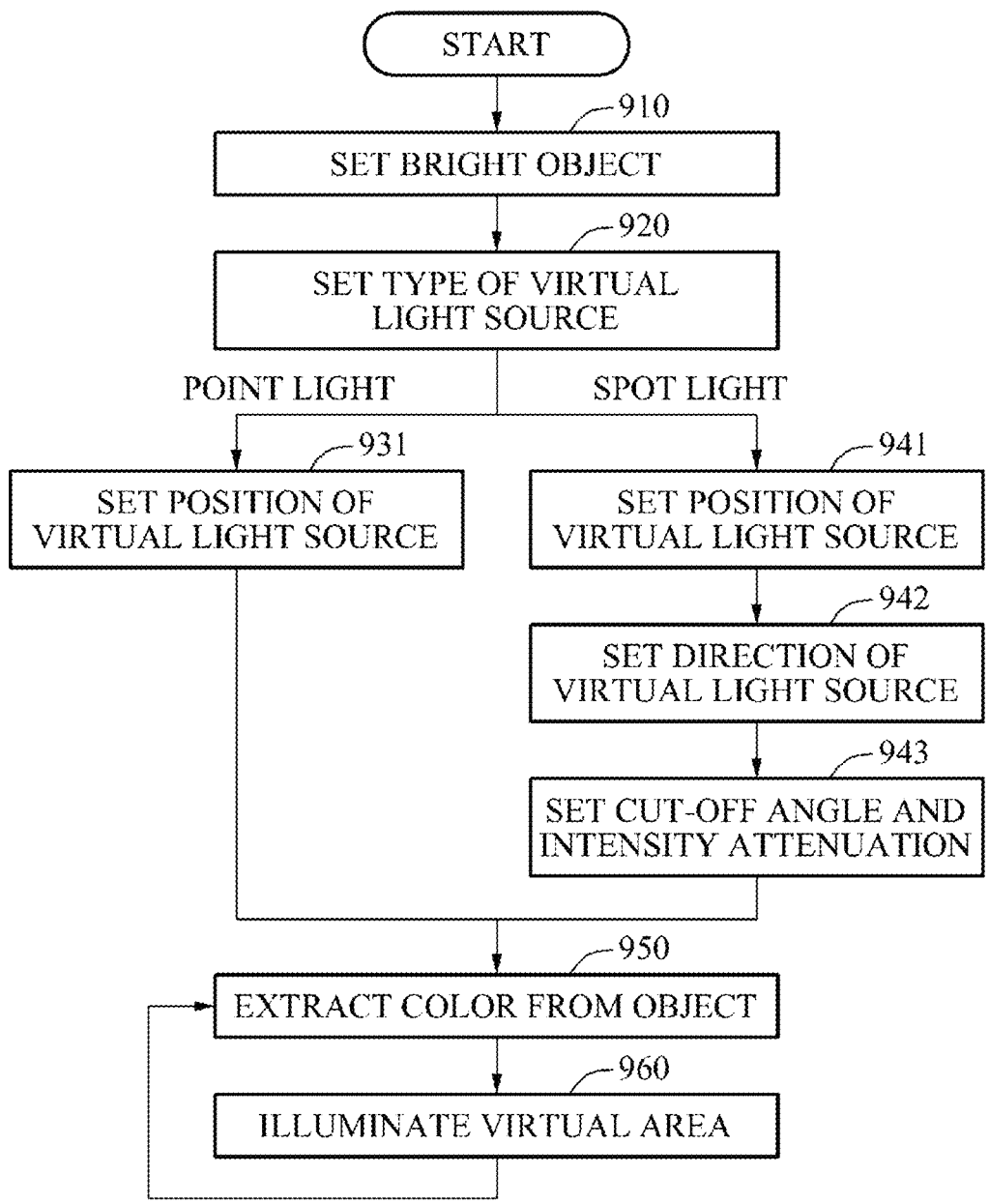
Figure 10:
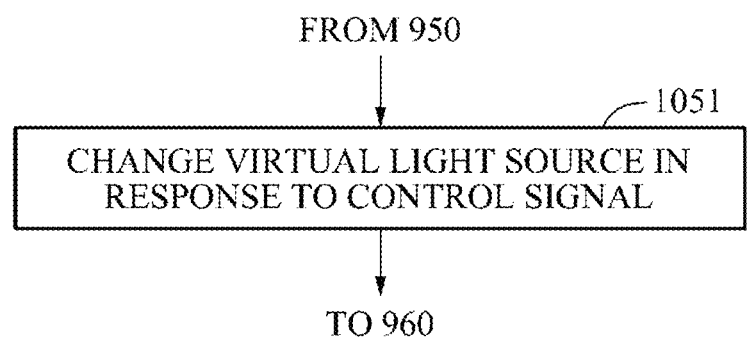

FIGS. 8 through 10 are flowcharts illustrating examples of a method of displaying an object to which a virtual light source is set.

Referring to FIG. 8, in operation 810, a processor of a display device displays an object to which a virtual light source is set, using a display. For example, the object to which the virtual light source is set may be displayed on an object area in a virtual environment.

The virtual environment may include a virtual space in which a video object and/or a photo object is provided. For example, the virtual environment may include a virtual space in which at least one photo object is provided based on a predetermined arrangement. The predetermined arrangement may be an arrangement in which a plurality of photo objects is aligned in a line and/or an arrangement in which the plurality of photo objects is aligned on a virtual wall within the virtual space. The predetermined arrangement will be further described with reference to FIGS. 20 and 21.

In operation 820, the processor illuminates surroundings of the object based on the virtual light source. For example, the processor may display the virtual environment to which an illumination effect of the virtual light source is applied. The illumination effect may be applied only within the virtual area, and may not be applied to an area outside the virtual area.

The processor may calculate the virtual area to which the illumination effect is to be applied, based on an illuminating orientation, a position, a cut-off angle, and/or an intensity attenuation of the virtual light source. For example, the processor may calculate the virtual area toward which a light from the virtual light source is projected, based on the illuminating orientation, the position, the cut-off angle, and/or the intensity attenuation of the virtual light source.

The processor may extract a color of a position of each virtual light source from the object, and may apply the extracted color to the virtual light source. For example, the processor may extract, as a color value, a statistical value of color values around the position of each virtual light source.

For example, when the display device displays a video object, the processor may display a virtual environment on the display by applying, to a virtual light source, a color of a position of the virtual light source in a frame per frame of the video object. As another example, when the display device displays a plurality of photo objects, the processor may display, on a virtual space using the display, a visual effect by a virtual light source set for each photo object.

According to an example, the processor may adjust a level of an illumination effect by a virtual light source in response to a control signal received from a user. For example, the control signal may be a signal that maintains a brightness of an object displayed on an object area and changing only the level of the illumination effect by the virtual light source set for the object.

When a plurality of objects is present on a virtual space, the processor may set a brightness of a virtual light source set to a predetermined object among the plurality of objects to be brighter than a brightness of a virtual light source set to another object among the plurality of objects. The predetermined object may be an object that is determined to be displayed on a center of a screen, an object automatically selected based on a predetermined standard, or an object selected by a user.

Referring to FIG. 9, in operation 910, a user or a processor of a display device sets a bright object. The user or the processor may set the bright object to influence a virtual environment around the object as an object having a bright characteristic. The processor may set any object received by the display device, an object selected based on a predetermined standard, or an object selected by the user, as the object having the bright characteristic. For example, the object may include a neon sign object, a video object, a photo object, and/or a still image object.

In operation 920, the user or the processor sets a type of a virtual light source. For example, the type of the virtual light source may be set as a spot light type influencing only a partial area around the object and attenuating in the virtual environment, or a point light type uniformly influencing the overall virtual environment without having attenuation. The above two types may be provided from a graphics engine and/or a software standard, and may be available in a PC and/or a mobile device. When the virtual light source is provided in the point light type, the user or the processor continues in operation 931. When the type of the virtual light source is provided in the spot light type, the user or the processor continues in operation 941.

In operation 931, the user or the processor sets a position of the virtual light source. For example, in the case of the point light type, the entire virtual environment may be a virtual area, and thus, the processor or the user may set only the position of the virtual light source. The position of the virtual light source may be set to be within the object.

In operations 941 through 943, the user or the processor sets information of the virtual light source. In detail, in operation 941, the user or the processor sets the position of the virtual light source. In operation 942, the user or the processor sets a direction, for example, an illuminating orientation, of the virtual light source. In operation 943, the user or the processor sets a cut-off angle and an intensity attenuation of the virtual light source. The processor may display an illumination effect by the spot light type, so that a level of the illumination effect decreases as a light is directed in the illuminating orientation and becomes away from the position of the virtual light source. The cut-off angle may be an angle based on the illuminating orientation. For example, when the cut-off angle is 45 degrees based on the illuminating orientation, the illumination effect by the virtual light source set to the object may not be applied to an area of the virtual environment that is present outside 45 degrees based on the illuminating orientation.

In operation 950, the processor extracts a color from the object. The processor may extract a color of the virtual light source from colors designated for the object, for example, a video object and/or a photo object, in real time. For example, the processor may extract a color value of a position of the object to which the virtual light source is designated, or a position of an object area. As another example, the processor may extract a color of the virtual light source by sampling a statistical value, for example, an average value, a weighted average value, and a median value, of color values around the position of the object or the object area.

In operation 960, the processor illuminates the virtual area. The virtual area may be calculated by the processor based on information, such as, for example, the position, the direction, the cut-off angle, the intensity attenuation, and the color value of the virtual light source set to the object or the object area. For example, the processor may perform a light calculation provided from a graphics engine and/or a software standard, such as, for example, DirectX, OpenGL, and OpenGL ES, based on the information of the virtual light source, and may apply, to the virtual environment in real time, the illumination effect of the virtual environment by the virtual light source set to the object.

FIG. 10 is a flowchart illustrating a display method in response to a control signal of a user. In operation 1051, a processor changes a virtual light source in real time in response to a control signal. In detail, prior to applying the illumination effect to the virtual environment in operation 960 of FIG. 9, the processor receives the control signal from the user. The user may adjust a level of change in the virtual environment occurring due to an object by inputting the control signal into a display device using an interface. The interface is a unit that receives a user input, and may include, for example, a touch screen, a touch pad, and/or a button.

The processor may control a level of influence (i.e., a level of illumination) of the virtual light source on a virtual area, and a size of the virtual area influenced (i.e., illuminated) by the virtual light source, in response to the control signal. For example, when the display device is a smartphone, a brightness level of the virtual light source by a touch interface of the smartphone may be adjusted to be between 0 and 1. The user may turn off a level of the illumination effect by the object by adjusting the level of influence of the virtual light source on the virtual area to be 0 based on necessity. In response to the control signal received from the user, the display device may change only the level of influence by the virtual light source on the virtual area around the object, and may display the object while maintaining a brightness of the object.

Figure 11:
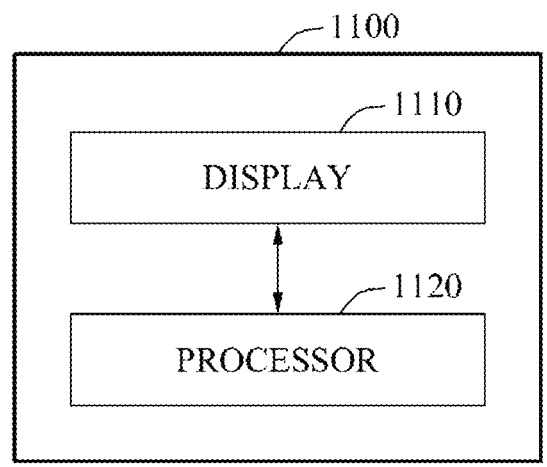
FIG. 11 is a block diagram illustrating an example of a display device.

FIG. 11 is a block diagram illustrating an example of a display device 1100. Referring to FIG. 11, the display device 1100 includes a display 1110 and a processor 1120.

The display 1110 displays an object to which a virtual light source is set, in a virtual environment. For example, the display 1110 may include a head mounted display (HMD), a stereoscopic display, and/or a touch screen, as a unit for displaying a visual effect of the object having a bright characteristic.

The virtual light source may be set to the object or an object area by a user or the processor 1120. For example, the processor 1120 may set positions of a plurality of virtual light sources to be in a grid form on the object area of the object. The processor 1120 may set an illuminating orientation and a position of each virtual light source, and may set a cut-off angle and intensity attenuation of each virtual light source, based on the illuminating orientation.

The processor 1120 illuminates a virtual area around the object in the virtual environment based on the virtual light source. For example, the processor 1120 may calculate a virtual area of each virtual light source based on the illuminating orientation and the cut-off angle. The processor 1120 may illuminate the virtual area by excluding the visual effect of the virtual light source on an inside of the object and by including the visual effect of the virtual light source on the virtual area around the object.

The processor 1120 may extract a color corresponding to the position of each virtual light source from the object, and may illuminate the virtual area by applying the extracted color to the virtual light source. For example, the processor 1120 may extract, as a color value of the virtual light source, an average value, a weighted average value, or a median value of color values around the position of the virtual light source.

The display device 1100 may further include an interface (not shown) that receives a control signal from the user. In response to the control signal received from the user, the processor 1120 may control a level of influence (i.e., a level of illumination) of the virtual light source on the virtual area and a size of the virtual area influenced (i.e., illuminated) by the virtual light source.

Figure 12:
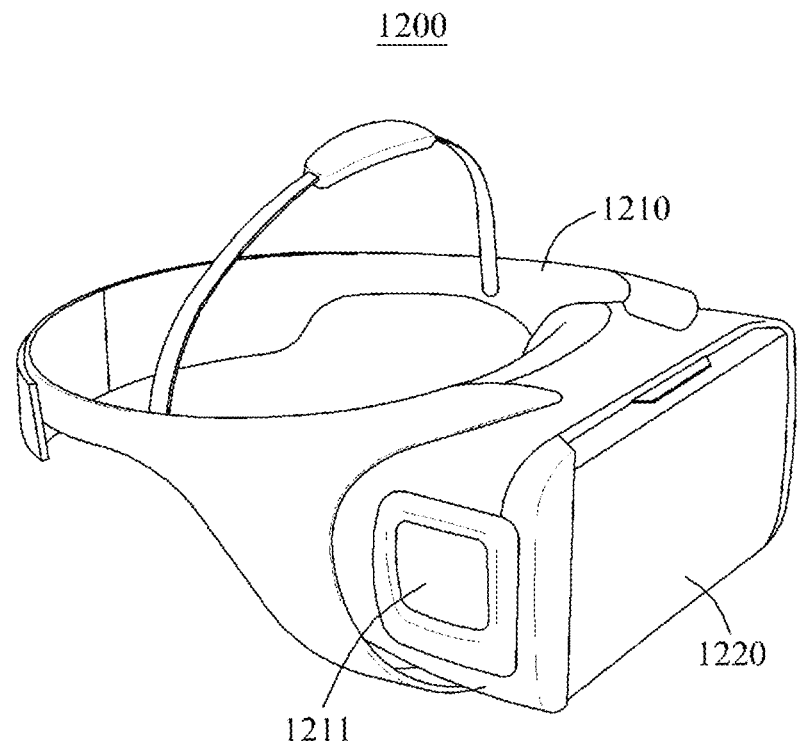
FIGS. 12 and 13 are diagrams illustrating examples of a display device.
Figure 13:
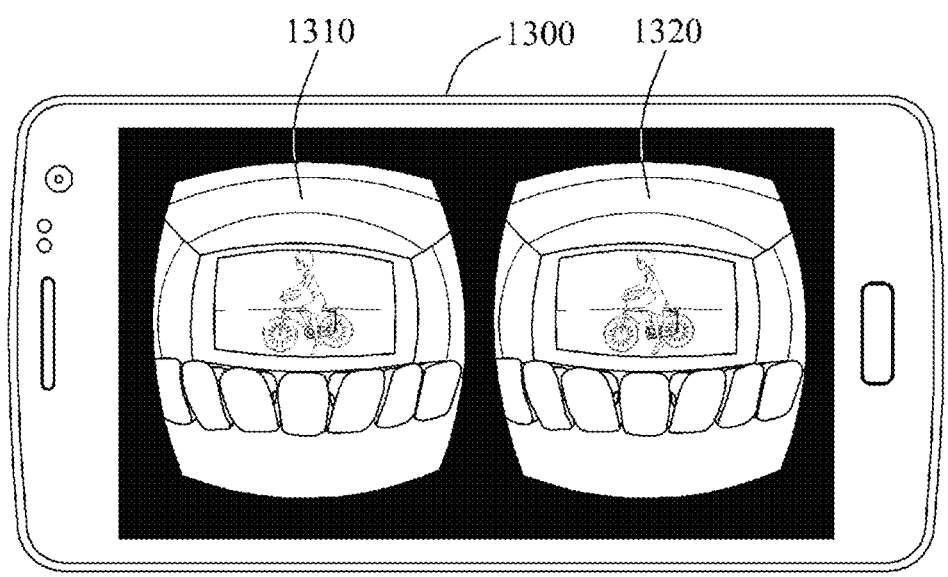

FIGS. 12 and 13 are diagrams illustrating examples of a display device.

Referring to FIG. 12, a display of a display device 1200 may include, for example, an HMD. In this example, the display device 1200 is provided in a form in which a smartphone 1220 is mounted to a head mounter 1210.

The head mounter 1210 includes an interface 1211 outside the head mounter 1210. For example, the interface 1211 may include a touch pad and/or a button. In response to a control signal received from the interface 1211 of the head mounter 1210, a processor of the smartphone 1220 may adjust a brightness level of a virtual light source.

For example, a continuous adjustment of the brightness level between 0 and 1 may be performed through a user operation of dragging the interface 1211, for example, the touch pad, up or down. An operation of turning on or off a visual effect of an object having a bright characteristic may be toggled through the interface 1211, for example, the button.

However, the interface 1211 is not limited to the aforementioned example. The processor may receive a control signal of a remote controller and/or a control signal corresponding to a hand motion gesture received through a variety of interfaces, in addition to the example of the display device 1200. In response to the received control signal, the processor may change and display a visual effect, for example, an illumination effect, by the virtual light source allocated to the object.

FIG. 13 illustrates a screen output from a display device 1300, for example, a smartphone, in the display device 1200 of FIG. 12. The display device 1300 provides a left image 1310 and a right image 1320 to three-dimensionally provide a virtual environment to a user. In this example, each of the left image 1310 and the right image 1320 may include an object having a bright characteristic and the virtual environment in which the object is present.

For example, the head mounter 1210 of FIG. 12 may be configured to provide the left image 1310 and the right image 1310 output from the display device 1300 to a left eye and a right eye of the user, respectively. The head mounter 1210 may provide the left image 1310 and the right image 1320 to the left eye and the right eye of the user, respectively, so that the user may view a 3D image.

FIGS. 14 through 21 are diagrams illustrating examples of a screen on which a visual effect by a virtual light source is displayed.

Figure 14:
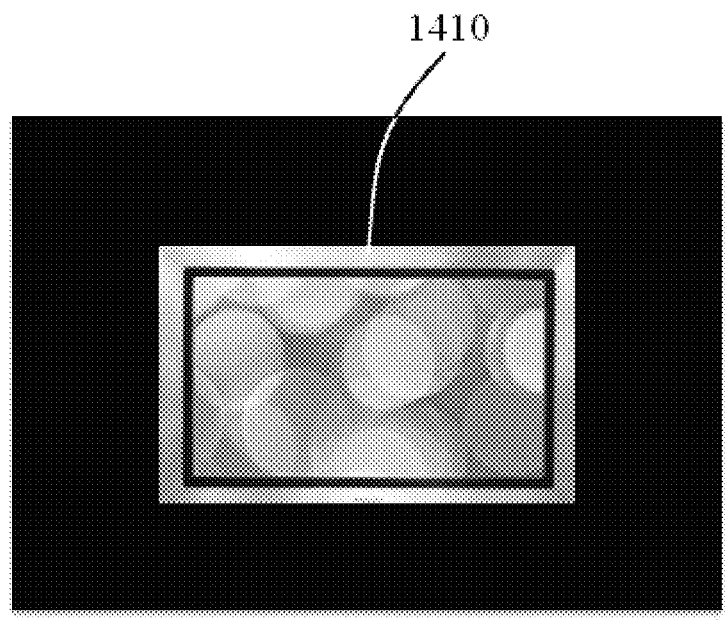
FIGS. 14 through 21 are diagrams illustrating examples of a screen on which a visual effect by a virtual light source is displayed.
Figure 15:
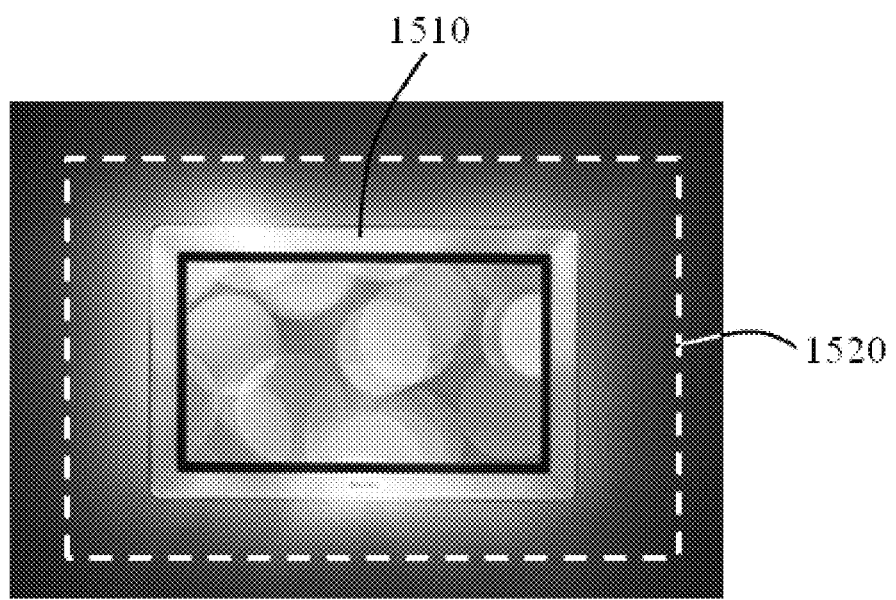

FIGS. 14 and 15 illustrate examples of a screen before and after applying a visual effect to an object. Referring to FIG. 14, a user may have a sense of a difference between an object 1410 and a virtual environment since only the object 1410 is displayed in the virtual environment, for example, a black wallpaper.

Referring to FIG. 15, an object 1510 is naturally displayed in a virtual environment by applying an illumination effect 1520 to the virtual environment. For example, a processor may set and generate a virtual light source for the object 1510 having a bright characteristic, and may display the virtual environment in which the illumination effect 1520 is applied, on a screen. As described above, a display device may display the screen influenced by the object 1510 and having a characteristic that the virtual environment is bright. Accordingly, compared to the example of FIG. 14, the object 1510 and the virtual environment may be more realistically represented.

FIGS. 16 through 19 illustrate examples of a display device that displays a VR cinema as a virtual environment. For example, a processor may model a virtual space similar to an actual cinema as the virtual environment. In this example, when an object area is disposed at a center of the virtual space, and a video object is played on the object area, a user may enjoy viewing a movie with a sense of immersion.

For example, when any of the display devices 1200 and 1300 as illustrated in FIGS. 12 and 13 is employed as the display device, the display device may detect a gaze movement of a user toward all directions and a head motion of the user, and in response thereto, may display a virtual environment corresponding thereto. Accordingly, the user may look around a VR cinema, and may view a movie by gazing at an object area located at a center of the VR cinema.

Figure 16:
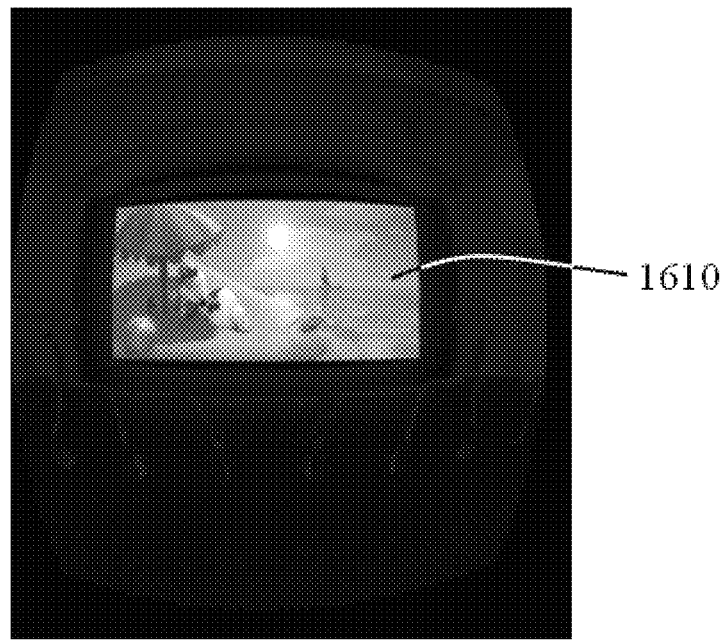

FIG. 16 illustrates an example of a virtual environment, for example, a VR cinema, to which an illumination effect is not applied. The virtual environment around an object 1610 is displayed to be uniform regardless of a change in a color or a brightness of the object 1610, for example, a video object.

Figure 17:
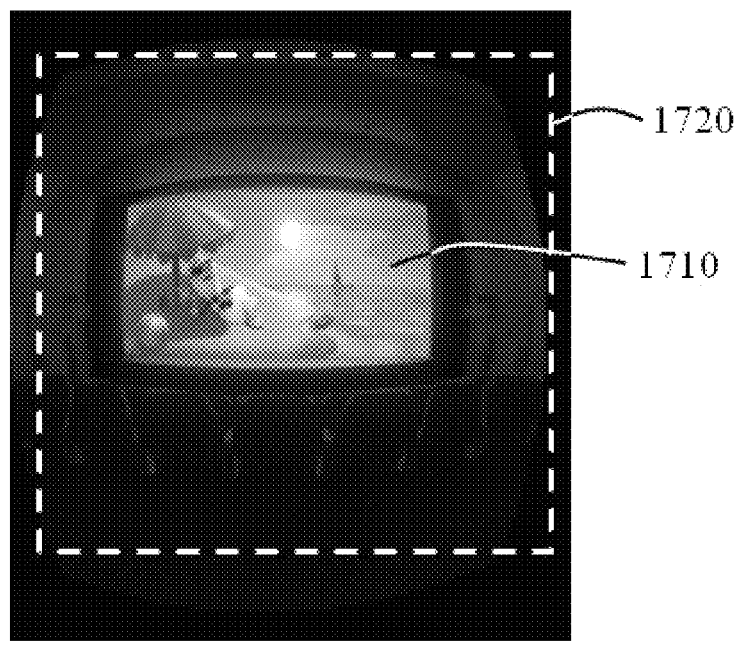
Figure 18:
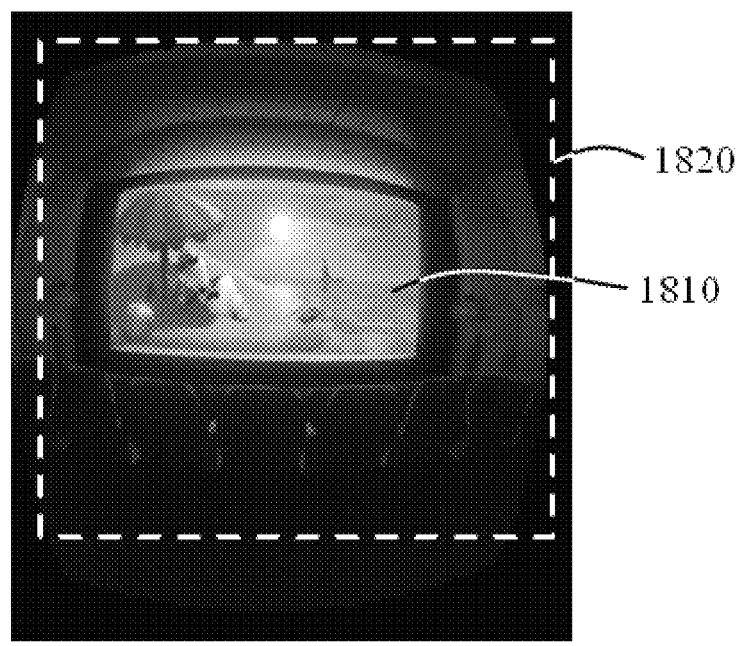
Figure 19:
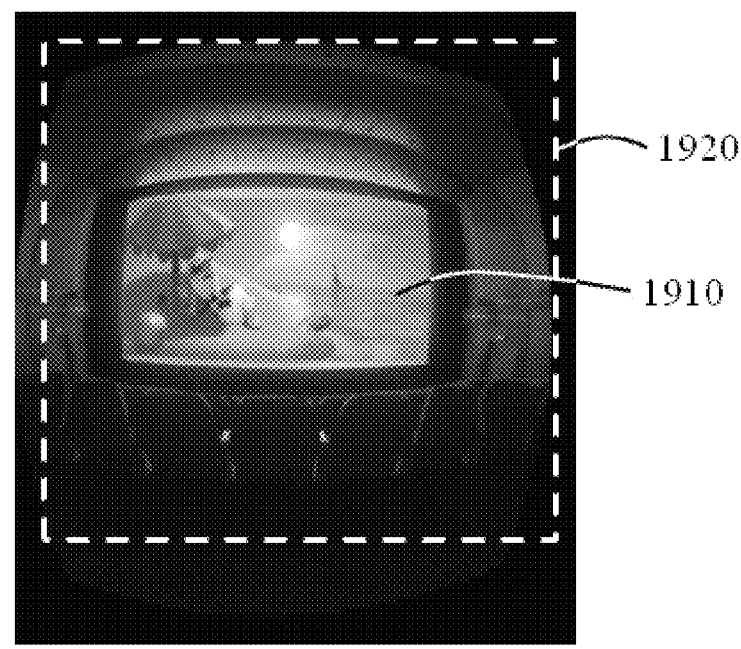

FIGS. 17 through 19 illustrate examples of a virtual environment to which an illumination effect 1720, 1820, or 1920 is applied. The illumination effect 1720, 1820, or 1920 is applied to a virtual environment around an object 1710, 1810, or 1910 in response to a change in a color or a brightness of the object 1710, 1810, or 1910, respectively. For example, when a video object having a brownish color is being displayed, a virtual environment may be changed into a brown tone. When a video object having a bluish color is being displayed, a virtual environment may be changed into a blue tone. Also, a virtual environment may be variously changed based on a color or a brightness of an edge of a video object, and be displayed.

For example, the processor may apply an illumination effect to a virtual environment so that the virtual environment may appear similar to an inner environment of an actual cinema. Also, the processor may apply an illumination effect of a virtual environment in real time based on a video object. Accordingly, a virtual area around the video object may be displayed to appear bright according to an increase in a brightness of the video object. Conversely, the virtual area may be displayed to appear dark according to a decrease in the brightness of the video object. Accordingly, a display device may provide a user with a sense of immersion as if the user is present in an actual cinema.

FIGS. 17 through 19 illustrate examples of a screen on which a level of an illumination effect is differentially applied in response to a control signal received from a user. For example, a display device may apply a relatively low level, for example, a level close to 0, of an illumination effect 1720 in FIG. 17, may apply an intermediate level, for example, a level between 0 and 1, of an illumination effect 1820 in FIG. 18, and may apply a relatively high level, for example, a level close to 1, of an illumination effect 1920 in FIG. 19. In detail, an illumination effect by an object is applied to be relatively bright in an order of the examples of FIGS. 17 through 19. A level of an illumination effect may be readily changed in response to a control signal based on a user preference. As described above, changing, by the processor, the level of the illumination effect in response to the control signal may be applied to all virtual environments, an object, as well as a VR cinema.

Figure 20:
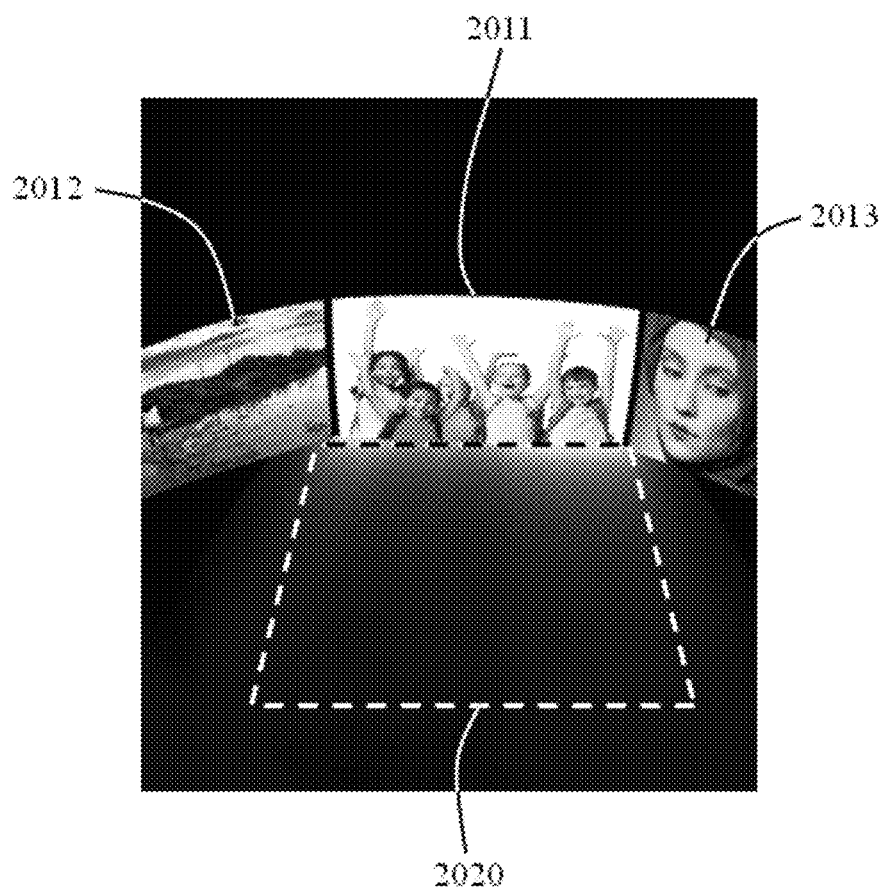

FIG. 20 illustrates an example of a screen of a display device on which a VR gallery is displayed as a virtual environment. For example, in the VR gallery, a photo gallery of the display device, for example, a smartphone, may be displayed as a 3D virtual space. The display device may enable a user to have a feeling as if the virtual space is an actual space by changing the virtual environment around photo objects 2011, 2012, and 2013 based on colors or brightness of the photo objects 2011, 2012, and 2013.

For example, the VR gallery of FIG. 20 refers to a virtual environment including a virtual space in which a floor is present. The processor may stand the photo objects 2011, 2012, and 2013, display the standing photo objects 2011, 2012, and 2013, and apply colors and brightness of the photo objects 2011, 2012, and 2013 to a virtual area corresponding to the floor of the virtual environment. Accordingly, the user may not perceive a difference between the photo objects 2011, 2012, and 2013 and the virtual environment around the photo objects 2011, 2012, and 2013, and may have a feeling as if photos are present in an actual space.

Also, the processor may display the three photo objects 2011, 2012, and 2013 standing side by side in the virtual environment. For example, the processor may set a brightness of a virtual light source set to a predetermined object, for example, the photo object 2011 located at a center of the screen among the photo objects 2011, 2012, and 2013 in the virtual space, to be greater than a brightness of a virtual light source set to each of other objects. Referring to FIG. 20, an illumination effect 2020 by the photo object 2011 located at the center is applied to the virtual environment to be relatively brighter compared to the other photo objects 2012 and 2013. The display device may enhance a sense of immersion by displaying the illumination effect 2020 by the photo object 2011 to be greater than that of the photo objects 2012 and 2013. For example, the display device may enable a user to have a feeling as if the photo objects 2011, 2012, and 2013, virtual areas around the photo objects 2011, 2012, and 2013, and the virtual environment are continuously connected.

Figure 21:
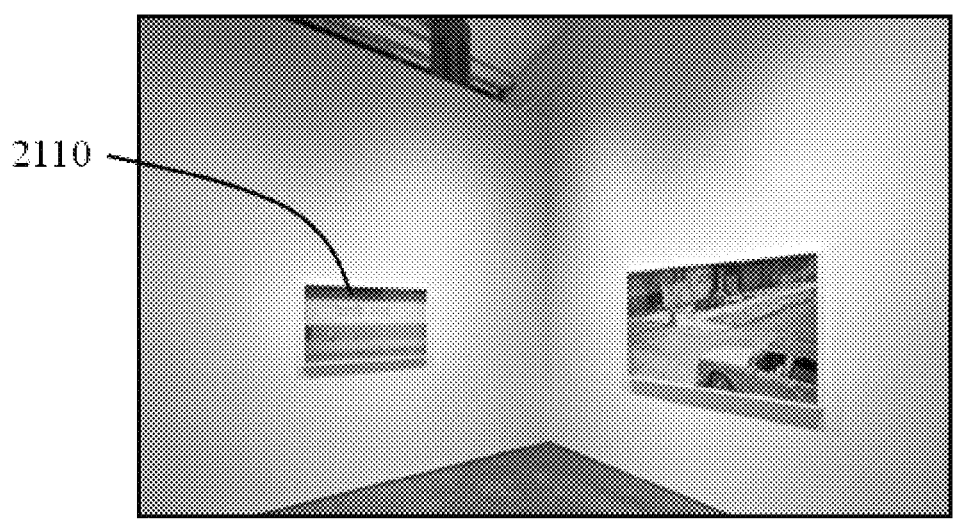

FIG. 21 illustrates an example of a screen of a display device on which a VR museum is displayed as a virtual environment. For example, the VR museum may be one of examples of a VR gallery, and may refer to a virtual environment configured to display a plurality of objects in a virtual space in a structure similar to an actual museum. Referring to FIG. 21, when an object 2110 is displayed on a virtual wall of the VR museum, a processor may apply an illumination effect by the object 2110 to a virtual area of the virtual wall.

The display device according to the examples may be applied to a mobile device to display 3D graphics and a VR image, and a variety of application products using the mobile device. For example, the display device may represent an illumination effect of a virtual environment by an object using a light effect representation of a software standard. The display device may realistically display, for example, a neon sign advertisement, a VR cinema, and a VR gallery of the virtual environment even in the mobile device in real time.

The display device may provide a user with a sense of reality in real time using a software standard, without performing a calculation using a high complexity, such as ray tracing, radiosity, and photo mapping, for example. Since a complexity of calculation is relatively low, the display device may apply an illumination effect by a bright object to a virtual environment in real time even in a mobile device. For example, the display device may set a virtual light source to an object having a bright characteristic, and may display an illumination effect of a virtual environment by the object with a calculation using a relatively low complexity through a light effect representation provided from a software standard.

The display device may employ a software standard using a GPU acceleration function, and thus, may display an illumination effect in real time even in a mobile device, such as a smartphone, for example.

The display device to display a visual effect by a bright object using a software standard may employ a programming definition as expressed by Table 1 with respect to a virtual light source.

TABLE 1 enum LIGHT_TYPE
{
　LIGHT_SPOT,
　LIGHT_POINT,
　LIGHT_DIRECTIONAL,
　LIGHT_VPL

TABLE 1-continued

```
}
Class Light
{
    int lightType,
    bool visible,
    float position[4],
    float spotDirection[4],
    float diffuse[4],
    float ambient[4],
    float specular[4],
    float cutoff,
    float exponent,
    Light(LIGHT_TYPE lighttype),
    ~Light( ),
    void setLightType(LIGHT_TYPE lighttype),
    void Visible(bool value = true),
    void setPosition(x, y, z),
    void setSpotDirection(x, y, z),
    void setCutoff(value),
    void setDiffuse(r, g, b, a),
    void setAmbient(r, g, b, a),
    void setSpecular(r, g, b, a),
    void setAttenuation(constant,linear,quad),
    void setVPLTargetImage(image),
    void getVPLColorfromImage( ),
}
```

The various units, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

As a non-exhaustive illustration only, a device described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A display method comprising:
   displaying, in a virtual environment, an object in a position where a plurality of virtual light sources are set or in the position where the object is set to be displayed;
   extracting, from the object, color values around positions of the plurality of virtual light sources; and
   illuminating an area around the displayed object using the plurality of virtual light sources to which the color values are applied,
   wherein an illumination effect of the plurality of virtual light sources is excluded on the object itself and a light amount of the illumination effect decreases as a distance becomes further away from a position of the plurality of virtual light sources,
   wherein information of the plurality of virtual light sources are automatically set and the information of the plurality of virtual light sources include the positions, an intensity attenuation and an interval between each pair of the plurality of virtual light sources, and
   wherein the positions of plurality of virtual light sources are set in a grid form on an object area of the object.

2. The method of claim 1, wherein the positions of the plurality of virtual light sources are set at predetermined intervals within the object.

3. The method of claim 1, wherein the extracting comprises:
   extracting, from the object as the color values, one of an average value, a weighted average value, and a median value of color values around the positions of the plurality of virtual light sources.

4. The method of claim 1, wherein the illuminating comprises:
   controlling either one or both of a level of the illumination of the area, and a size of the illuminated area, in response to a control signal.

5. The method of claim 1, wherein the object comprises either one or both of a still image object and a video object.

6. A display method comprising;
   displaying, in a virtual environment, an object in a position where a plurality of virtual light sources are set or in the position where the object is set to be displayed;
   extracting, from the object, color values around positions of the plurality of virtual light sources; and
   illuminating an area around the displayed object using the plurality of virtual light sources to which the color values are applied,
   wherein an illumination effect of the plurality of virtual light sources is excluded on the object itself and a light amount of the illumination effect decreases as a distance becomes further away from a position of the plurality of virtual light sources, and
   wherein the plurality of virtual light sources comprise either spot lights or point lights, and in response to a virtual light source of the plurality of virtual light sources being a spot light, setting an illuminating orientation, a position, a cut-off angle, and an intensity attenuation of the virtual light source, based on the illuminating orientation.

7. The method of claim 6, wherein the illuminating comprises:
   calculating the area based on the illuminating orientation and the cut-off angle.

8. A display device, comprising:
   a display; and
   a processor configured to:
   display, in a virtual environment on the display, an object in a position where a plurality of virtual light sources are set or in the position where the object is set to be displayed,
   extract color values of pixels for portions of the object, and
   illuminate, on the display, an area around the object using the plurality of virtual light sources to which the color values are applied,
   wherein an illumination effect of the plurality of virtual light sources is excluded on the object itself and a light amount of the illumination effect decreases as a distance becomes further away from a position of the plurality of virtual light sources,
   wherein information of the plurality of virtual light sources are automatically set and the information of the plurality of virtual light sources include positions, an intensity attenuation and an interval between each air of the plurality of virtual light sources, and wherein the positions of plurality of virtual light sources are set in a grid form on an object area of the object.

9. The display device of claim 8, wherein the processor is further configured to:
set any one or any combination of an illuminating orientation, a position, a cut-off angle, and the intensity attenuation of the plurality of virtual light sources in response to the plurality of virtual light sources being spot lights.

10. The display device of claim 9, wherein the processor is configured to:
calculate the area based on any one or any combination of the illuminating orientation, the position, the cut-off angle, and the intensity attenuation.

11. The display device of claim 8, wherein the processor is configured to:
extract, from the object as the color values, one of an average value, a weighted average value, and a median value of color values around the position of the plurality of virtual light sources.

12. The display device of claim 8, wherein the processor is further configured to:
control a level of the illumination of the area in response to a control signal.

13. The display device of claim 8, wherein:
the object comprises a video object;
the virtual environment comprises a virtual space in which the video object is provided; and
the processor is further configured to apply, to the plurality of virtual light sources, a color of a position of the plurality of virtual light sources in a frame per frame of the video object.

14. The display device of claim 8, wherein:
the object comprises a photo object;
the virtual environment comprises a virtual space in which the photo object is provided based on a predetermined arrangement; and
the processor is further configured to illuminate, on the display, the virtual space based on the set plurality of virtual light sources.

15. The display device of claim 8, wherein the processor is further configured to:
set a brightness of the plurality of virtual light sources set to the position of the object of objects in the virtual environment to be brighter than a brightness of another virtual light source set to a position of another object of the objects.

16. The display device of claim 8, wherein the display comprises any one or any combination of a head mounted display, a stereoscopic display, and a touch screen.

17. A display device comprising:
a display configured to display, in a virtual environment, an image comprising an object;
an interface configured to receive an input; and
a processor configured to:
maintain an illumination effect on the object, and change an illumination effect on surroundings of the object, in response to the input, wherein the illumination effect on the surroundings is generated by
displaying, on the display in the virtual environment, the object in a position where a plurality of virtual light sources are set or in the position where the object is set to be displayed,
extracting color values of pixels for portions of the object, and
illuminating, on the display, an area around the object using the plurality of virtual light sources to which the color values are applied,
wherein an illumination effect of the plurality of virtual light sources is excluded on the object itself and a light amount of the illumination effect decreases as a distance becomes further away from a position of the plurality of virtual light sources,
wherein information of the plurality of virtual light sources are automatically set and the information of the plurality of virtual light sources include positions, an intensity attenuation and an interval between each pair of the plurality of virtual light sources, and
wherein the positions of virtual light sources are set in a rid form on an object area of the object.

18. The display device of claim 17, wherein the processor is further configured to:
calculate the illumination effect on the surroundings of the object based on the object.

19. The display device of claim 17, wherein the processor is further configured to:
change a level of an illumination effect on the surroundings of the object in the position where the plurality of virtual light sources are set in the virtual environment, in response to the input.

20. The display device of claim 17, wherein the processor is further configured to:
turn on and off the illumination effect on the surroundings of the object, in response to the input.

21. A display device comprising:
a display configured to display images in frames of a video object; and
a processor configured to:
change an illumination effect on surroundings of the images per frame of the video object, during playing of the video object, wherein the illumination effect on the surroundings is generated by,
displaying, on the display in a virtual environment, where the images per frame of the video object are displayed in a position where a plurality of virtual light sources are set or in the position where the images per frame of the video object are set to be displayed,
extracting color values of pixels for portions of the images per frame of the video object, and
illuminating, on the display, an area around the images per frame of the video object using the plurality of virtual light sources to which the color values are applied,
wherein an illumination effect of the plurality of virtual light sources is excluded on the object itself and a light amount of the illumination effect decreases as a distance becomes further away from a position of the plurality of virtual light sources,
wherein information of the plurality of virtual light sources automatically set and the information of the plurality of virtual light sources include positions, an intensity attenuation and an interval between each r air of the plurality of virtual light sources, and
wherein the positions of plurality of virtual light sources are set in a grid on an object area of the object.

22. A display device comprising:
a display; and
a processor configured to:
display, on the display in a virtual environment, an object in a position where a plurality of virtual light sources are set or in the position where the object is set to be displayed, extract color values of pixels for portions of the object that correspond to positions of the plurality of virtual light sources of light, and illuminate, on the display, an area around the object based on the set plurality of virtual light sources to which the color values are applied, wherein an illumination effect of the plurality of virtual light sources is excluded on the object itself and a light amount of the illumination effect decreases as a distance becomes further away from a position of the plurality of virtual light sources, wherein information of the plurality of virtual light sources are automatically set and the information of the plurality of virtual light sources include positions, an intensity attenuation and an interval between each pair of the plurality of virtual light sources, and wherein the positions of plurality of virtual light sources are yet in a grid form on an object area of the object.

23. The display device of claim 22, wherein the processor is further configured to:

set a direction, a cut-off angle, and the intensity attenuation of a virtual light source of the plurality of virtual light sources, in response to the virtual light source being a spot light.

24. The display device of claim 22, wherein the processor is further configured to:

extract, from the object, a color of the position of a virtual light source of the plurality of virtual light sources; and apply the color to the virtual light source.

25. The display device of claim 22, wherein the processor is further configured to:

illuminate an area around the object to enhance a user's sense of immersion in the display.

* * * * *